United States Patent Office 2,924,933
Patented Feb. 16, 1960

2,924,933

EXHAUST NOZZLE CONTROL DEVICE

Wallace M. Grube, Manchester, and Bruce N. Torell, Wethersfield, Conn., assignors to United Aircraft Corporation, East Hartford, Conn., a corporation of Delaware Application January 2, 1953, Serial No. 329,182

3 Claims. (Cl. 60—35.6)

This invention relates to a control for a propelling nozzle on a turbojet engine and more particularly on a turbojet engine incorporating means for augmenting propulsive thrust by the burning of additional fuel between the turbine and the propelling nozzle, hereafter referred to as "afterburning."

An object of this invention is to provide a control which will increase the propelling nozzle area for afterburning, thereby preventing an initial loss of thrust and an excessive buildup of temperature in the turbine of the jet engine.

Another object is to provide a nozzle which will not increase the propelling nozzle area if the afterburner fails to ignite.

Another object is to provide a control which will automatically close the propelling nozzle when the afterburning ceases.

A further object is to provide a control which will continue to maintain the increased nozzle area as long as the afterburner is in operation.

Another object of this invention is to provide a control for a propelling nozzle having no evacuated chambers.

A further object is to provide a control having a shaft responsive to engine pressures for actuating said nozzle.

Further objects and advantages will be apparent from the following specification and drawings.

Figure 1:
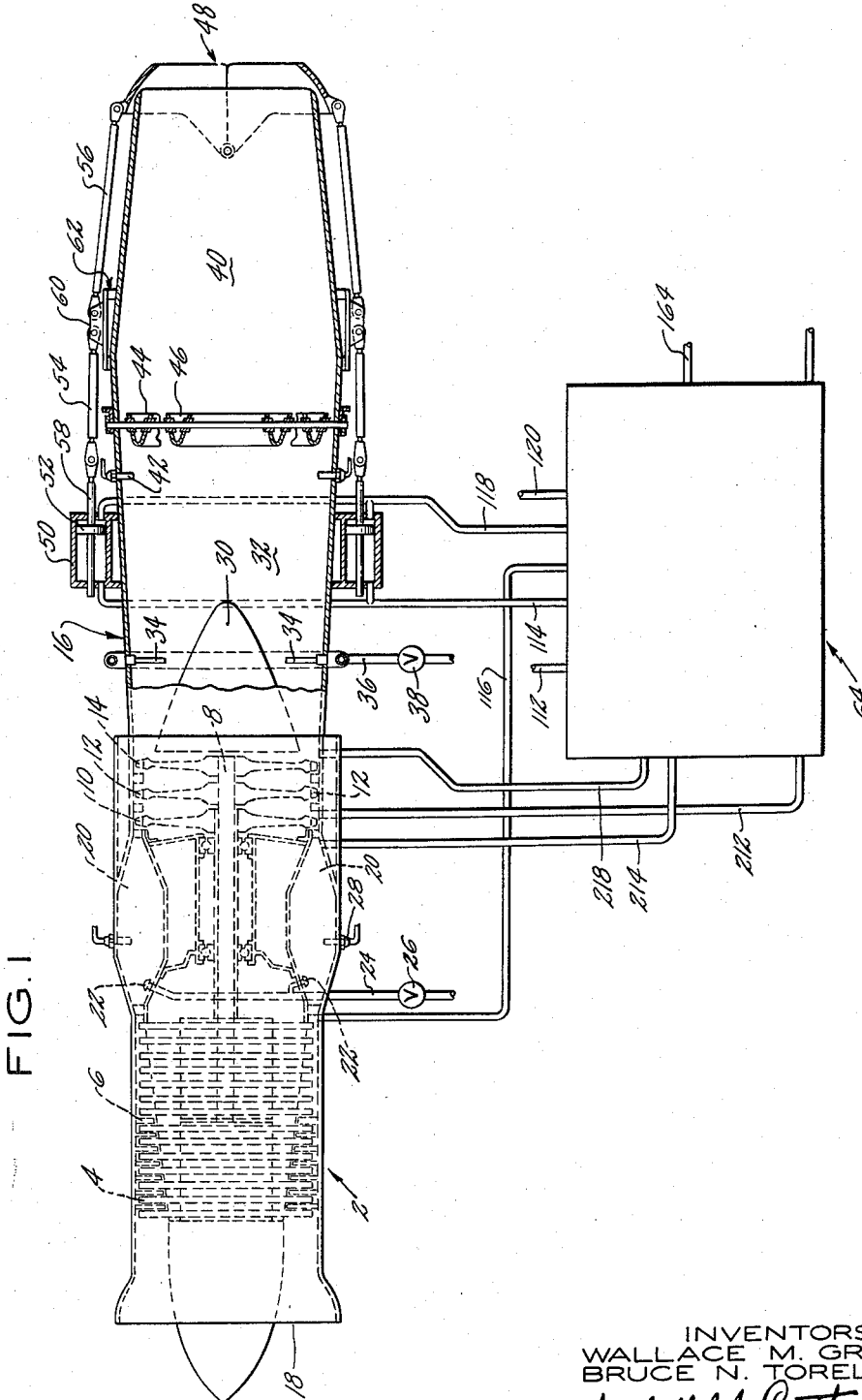
Fig. 1 is a view of a turbojet engine including an afterburner showing the exhaust nozzle actuator control.

With reference to Fig. 1, the turbojet engine 2 is a split turbine type power plant. It includes a low pressure compressor 4 and a high pressure compressor 6 driven respectively by a low pressure turbine 8 and by a high pressure turbine 10. The low pressure turbine has two stages, the first stage being indicated by the reference numeral 12 and the second stage being represented by the reference numeral 14. An afterburner 16 is attached to the outlet of the second stage 14 of turbine 8 to provide a means of increasing the thrust.

Air enters the low pressure compressor at the inlet 18 and is discharged into the combustion chambers 20 from the high pressure compressor 6 where fuel is added through nozzles 22. These fuel nozzles 22 receive fuel from a fuel supply through conduit 24 which can be controlled by valve 26. The fuel-air mixture thus formed is initially ignited within the combustion chambers 20 by a spark igniter 28. While many types of fuel control systems may be used to inject fuel through nozzles 22 one system is shown and claimed in copending application Serial No. 240,304 of Bruce N. Lorell et al., filed August 4, 1951.

The products of combustion from the combustion chambers 20 discharge through both turbines 8 and 10 around a cone 30 into the diffuser section 32 of the afterburner. When the afterburner is operating, fuel is discharged into these gases from a plurality of fuel nozzles 34 located in the diffuser 32. These fuel nozzles 34 receive fuel from a fuel supply through conduit 36 which can be controlled by valve 38. Since the gases leaving the two stage turbine 8 contain considerable unburned oxygen the additional fuel introduced by fuel nozzles 34 provides a combustible mixture which may be initially ignited within combustion chamber 40 of the afterburner by a spark igniter 42. While many types of fuel meters may be used to control the fuel flow to the afterburner, one specific fuel meter is shown and claimed in copending application Serial No. 196,414 of Robert N. Abild, filed November 18, 1950, now Patent No. 2,714,803, issued August 9, 1955. The burning of the combustible mixture in the afterburner is stabilized within the combustion chamber 40 by flameholders 44 and 46. The burned gas is discharged from the engine through the nozzle 48 whose area can be varied.

The variable nozzle 48 operates at its minimum opening for engine operation without afterburning and at its maximum opening for operation of the engine with afterburning. A nozzle and actuating system similar to the one shown with this invention is shown and claimed in copending application Serial No. 193,734 of Frederick L. Geary, filed November 2, 1950, now Patent No. 2,714,285, issued August 2, 1955. The actuating system consists of a cylinder 50, piston 52, connecting control rod 54, nozzle control rod 56, piston rod 58, car 60, and track mechanism 62 for said car. An exhaust nozzle actuator control 64 connects an operating pressure to the exhaust nozzle actuating cylinders 50 to open or to close the exhaust nozzle as required.

The exhaust nozzle actuator control 64 as shown connects compressor discharge pressure to the exhaust nozzle actuating cylinders 50 by an air relay valve 100 either to open or close the exhaust nozzle as required. This air relay valve 100 has three lands, 102, 104 and 106 which serve to connect passages and guide the valve in its cylindrical bore 108. A chamber 110 is formed at one end of said cylindrical bore 108. The cylindrical bore 108 and chamber 110 have six passages connected thereto. They are from left to right in Fig. 2, a vent 112 to a low pressure supply which may be atmospheric pressure, a conduit 114 which is connected at its other end to the end of the cylinder away from the nozzle (nozzle closing end), a conduit 116 which is connected at its other end to a high pressure supply shown as compressor discharge pressure ($P_{s4}$), a conduit 118 which is connected at its other end to the end of the cylinders 50 nearest the nozzle (nozzle opening end), a vent 120 to a low pressure supply which may be atmospheric pressure, and a passageway 122 which serves as a drain. A short cylindrical bore 124 opens into the other end of cylindrical bore 108 away from chamber 110. This cylindrical bore is of a smaller diameter than cylindrical bore 108 and is located concentric thereto. A piston cap 126 is located in said cylindrical bore 124 with its open end facing towards the air relay valve 100. A stop 128 projects from the end of the bore to form a chamber 130 with the flat end of the piston cap 126. The right end of the air relay valve 100 has a projection 132 which projects into the open end of piston cap 126 for engagement therewith.

A bellows pressurizing valve 134 is located in said exhaust nozzle actuator control for a purpose to be hereinafter described. This pressurizing valve 134 has two lands, 136 and 138 which serve to connect passageways and guide the valve in its cylindrical bore 140. Cylindrical bore 140 intersects chamber 110 and is concentric to cylindrical bore 108, which also enters into chamber 110. The bellows pressurizing valve 134 has a projection 142 which extends into chamber 110. Said projection 142 has a large circular head 144 located on its free end. A spring 146 is located in chamber 110 between a valve seat 148 in said chamber and a valve seat 150 on the pressurizing valve side of said head 144. This spring biases bellows pressurizing valve 134 to the right against air relay valve 100, and biases air relay valve 100 to the right pressing projections 132 against piston cap 126 which in turn engages projection 128.

A pilot valve 152 is located in said actuator control. Said pilot valve has two lands 154 and 156 which serve to connect passageways and guide the valve in its cylindrical bore 158. A chamber 160 is formed at one end of said cylindrical bore 158. The cylindrical bore 158 and chamber 160 have three passages connected thereto, they are from top to bottom in Fig. 2, a passageway 162 which is connected at its other end to conduit 164 which supplies a source of fluid pressure, a passageway 166 which is connected at its other end to chamber 130 and a passageway 122 which serves as a drain. To prevent the nozzle 48 from opening without afterburning, the source of fluid pressure for conduit 164 can be a point in the afterburner fuel system downstream of the afterburner fuel pump which is off when there is no afterburning. A passageway 168 in valve 152 connects one end of the valve to the other. This prevents a lock forming in the chamber 169 at the end of said valve. A projection 170 extends into chamber 160 to serve as an actuating arm. A stop 171 is provided to limit the downward motion of valve 152 and the top of bore 158 serves this purpose for the upward motion of said valve.

An actuating device for said pilot valve is located in a chamber 172. This actuating mechanism includes a rotatable shaft 174 having one end mounted in a bearing 176 and having the other end mounted in a bearing 178. The end of shaft 174 mounted in bearing 178 extends through a seal 180 into chamber 160. Shaft 174 has mounted thereon four lever arms, 182, 184, 186 and 188. The three lever arms 182, 184 and 186 are operatively connected to pressure responsive bellows and will impart a torque, dependent upon bellows force and lever arm length, to shaft 174 to rotate the shaft, while lever arm 188 is used to transmit the rotational movement of shaft 174 to pilot valve 152 through projection 170. Lever arms 182, 184 and 186 are made adjustable in length by threadably attaching them to shaft 174. Each of these arms has a ball 185 fixed to its free end.

Three bellows, 190, 192 and 194 have one end fixed to the wall of chamber 172. The free end of bellows 190 coacts with the ball on arm 182 through a plate 187 on a stem 196. The free end of bellows 192 coacts with the ball on arm 184 through a plate 187 on a stem 198. The free end of bellows 194 coacts with the ball on arm 186 through a plate 187 on a stem 200. Stems 196, 198 and 200 are guided by a portion of the housing.

Figure 2:
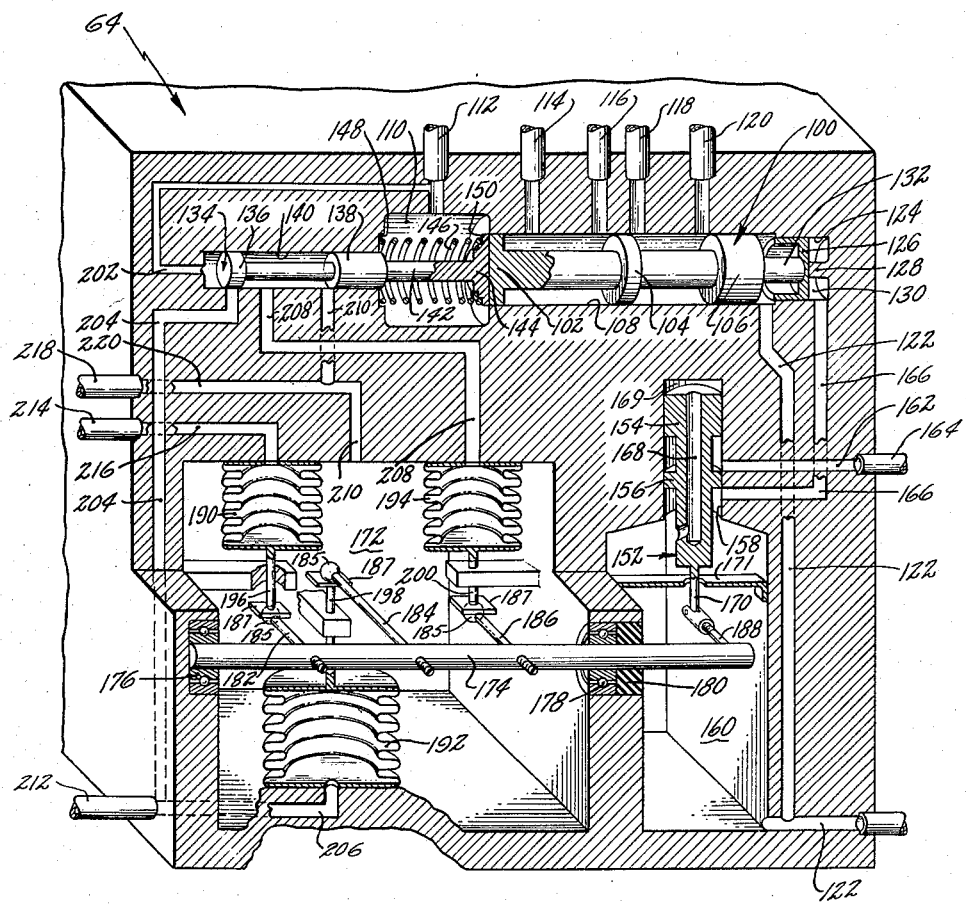
Fig. 2 is an enlarged schematic view of the exhaust nozzle actuator control.

The cylindrical bore 140 of the bellows pressurizing valve 134 has four passageways connected thereto, they are from left to right in Fig. 2, a vent 202, a passageway 204 which is connected at its other end to a passageway 206, passageway 208 which is connected at its other end to the interior of bellows 194, and a passageway 210 which is connected at its other end to chamber 172. The vent 202 is shown as being vented to conduit 112. Passageway 206 is connected at one end to the interior of bellows 192 and is connected at its other end to conduit 212.

Conduit 212 connects an intermediate turbine pressure ($P_{s6}$) to passageway 206. Conduit 214 connects turbine inlet pressure ($P_{s5}$) to the interior of bellows 190 through passageway 216. Conduit 218 connects turbine exhaust pressure ($P_{s7}$) to passageway 210 through passageway 220.

*Operation*

As the afterburner ignites, the exhaust nozzle actuator control 64 has its moving parts approximately in the positions shown in Fig. 2. In this position the control is functioning as follows: (*a*) turbine inlet pressure ($P_{s5}$) is admitted to bellows 190 through conduit 214 and passageway 216, (*b*) turbine intermediate pressure ($P_{s6}$) is admitted to bellows 192 through conduit 212 and passageway 206, (*c*) said turbine intermediate pressure ($P_{s6}$) is also admitted to bellows pressurizing valve 134 through passageway 204 which is connected to passageway 206, (*d*) turbine exhaust pressure ($P_{s7}$) is admitted to chamber 172 through conduit 218 and passageways 220 and 210, (*e*) spring 146 is biasing bellows pressurizing valve 134 to the right thereby directing turbine exhaust pressure from passageway 210 to passageway 208 where it is then admitted to bellows 194, (*f*) spring 146 is also biasing air relay valve 100 to the right directing compressor discharge pressure ($P_{s4}$) from conduit 116 to conduit 114 and connecting conduit 118 to vent conduit 120 to maintain nozzle 48 in its closed position, and (*g*) pilot valve 152 is positioned so that no actuating pressure is admitted to passageway 166.

Under these conditions, that is with the engine in a steady state operation without afterburning, there is a force exerted by bellows 190 which is a measure of turbine inlet pressure and turbine exhaust pressure ($P_{s5}-P_{s7}$) in combination with its linkage connection with shaft 174, and there is a force exerted by bellows 192 which is a measure of the turbine intermediate pressure and turbine exhaust pressure ($P_{s6}-P_{s7}$) in combination with its linkage connection with shaft 174. Bellows 194 is subjected both internally and externally to turbine exhaust pressure ($P_{s7}$) therefore the pressure difference ($P_{s7}-P_{s7}$) which is zero does not enter into this operation. The torque exerted by bellows 192 acting in a counterclockwise direction (rotative direction is viewed from right in Fig. 2) on shaft 174 is greater than the torque of bellows 190 acting in a clockwise direction on shaft 174. Therefore, shaft 174 is biased in a counterclockwise direction positioning pilot valve 152 as stated in (*g*) above; that is at a point so that no actuating pressure is admitted to passageway 166.

The ignition of fuel within the afterburner results in a considerable increase in turbine exhaust pressure ($P_{s7}$) and in the turbine intermediate pressure ($P_{s6}$) while turbine inlet pressure ($P_{s5}$) is virtually unaffected. Under these new conditions, there is a force exerted by bellows 190 which is a measure of turbine inlet pressure and turbine exhaust pressure ($P_{s5}-P_{s7}$) in combination with its linkage connection with shaft 174, and there is a force exerted by bellows 192, which is a measure of the turbine intermediate pressure and turbine exhaust pressure ($P_{s6}-P_{s7}$) in combination with its linkage connection with shaft 174. Bellows 194 is subjected both internally and externally to turbine exhaust pressure ($P_{s7}$) and therefore has a pressure difference ($P_{s7}-P_{s7}$) which is zero and does not enter into this operation. The torque exerted by bellows 190 acting in a clockwise direction on shaft 174 is now greater than the torque of bellows 192 acting in a counterclockwise direction on shaft 174. Therefore, shaft 174 is caused to rotate in a clockwise direction so as to move pilot valve 152 down to its lower position. This movement of the pilot valve connects the actuating pressure in conduit 164 and passageway 162 to passageway 166 and chamber 130.

Pressure in chamber 130 moves air relay valve 100 and bellows pressurizing valve 134 to the left against the force of spring 146. With the air relay valve 100 and bellows pressurizing valve 134 positioned to the left in Fig. 2, the control is functioning as follows: (*a*) turbine inlet pressure ($P_{s5}$) is admitted to bellows 190 through conduit 214 and passageway 216, (*b*) turbine intermediate pressure ($P_{s6}$) is admitted to bellows 192 through conduit 212 and passageway 206, and to bellows 194 through conduit 212, passageway 204, valve 134 and passageway 208, (*c*) turbine exhaust pressure ($P_{s7}$) is admitted to chamber 172 through conduit 218 and to passageways 220 and 210, (*d*) said turbine exhaust pressure ($P_{s7}$) is also admitted to bellows pressurizing valve 134 through passageway 210, (e) air relay valve 100 is directing compressor discharge pressure ($P_{s4}$) from conduit 116 to conduit 118 and connecting conduit 114 to vent conduit 112 to maintain nozzle 48 in its open position and (f) pilot valve 152 is positioned so that the actuating pressure in conduit 164 and passageway 162 is admitted to passageway 166 and chamber 130.

With the exhaust nozzle 48 open and as the afterburner begins operation, turbine intermediate pressure ($P_{s6}$) and turbine exhaust pressure ($P_{s7}$) rapidly return to their former (non-afterburning) values. From this it can be seen that without the bellows pressurizing valve 134 the nozzle actuating control would act to return its components to their non-afterburning positions. In this event the exhaust nozzle would close. This closure would cause the operating values of turbine intermediate pressure and turbine outlet pressure to change to attempt to open exhaust nozzle 48. Thus, the exhaust nozzle would alternately open and close causing thrust oscillations and temperature variations in excess of the desired values.

When afterburning ceases the turbine inlet pressure ($P_{s5}$), turbine intermediate pressure ($P_{s6}$), and the turbine exhaust pressure ($P_{s7}$) change to such values that shaft 174 will rotate in a counterclockwise direction. These values of the turbine pressures move pilot valve 152 to its top position which connects chamber 130 through conduit 166 and chamber 160 with drain 122. Spring 146 then returns the bellows pressurizing valve 134 and air relay valve 100 to their far right position. This action places the exhaust nozzle actuator control 64 in approximately the positions shown in Fig. 2.

The last described action occurs when the afterburning ceases either intentionally or unintentionally. If the afterburner has been intentionally turned off, in a system in which the afterburner fuel pump is also turned off, it can be seen that if the source of fluid pressure for conduit 164 comes from a point in the afterburner fuel system downstream of the afterburner fuel pump the nozzle will close from this action alone.

Although a specific exhaust nozzle actuator control has been shown and described herein for purpose of illustration, it will be evident to those skilled in the art that the invention is capable of various modifications and adaptations within the scope of the appended claims.

We claim:

1. A device for directing a fluid pressure from one conduit to one of two other conduits, including an inlet conduit and a first outlet conduit and a second outlet conduit, a relay valve for connecting said inlet conduit to said first outlet conduit or said second outlet conduit, a pilot valve for moving said relay valve in one direction, a spring for moving said relay valve in the other direction, and a rotatable shaft attached by a lever arm to said pilot valve for moving it, means responsive to a ratio of two pressure differentials for rotating said shaft in one direction to a predetermined position and being responsive to a second ratio of said pressure differentials for maintaining said shaft in said predetermined position, said last named means including a chamber with three bellows, each bellows having one end fixed to said chamber, each bellows having its free end connected to said shaft by a lever arm, a bellows pressurizing valve, said bellows pressurizing valve including two inlet passageways and one outlet passageway, said outlet passageway being connected at its other end to the interior of one of said bellows, said bellows pressurizing valve being adapted to connect said outlet passageway to one of said two inlet passageways, said bellows pressurizing valve being connected to said relay valve for movement therewith.

2. In combination, a turbojet engine including a compressor, a burner, a split-turbine and a variable area propelling nozzle through which gas from the engine is discharged, means for adjusting the area of said nozzle, and means to control said adjusting means, said control means including a first valve, means for actuating said first valve including first pressure responsive means responsive to the difference between turbine inlet pressure and turbine exhaust pressure, second pressure responsive means responsive to the difference between turbine intermediate pressure and turbine exhaust pressure, and third pressure responsive means, means for admitting turbine intermediate pressure or turbine exhaust pressure to said third pressure responsive means, second valve means selectively controlling the admission or turbine intermediate pressure or turbine exhaust pressure to said third pressure responsive means, and means for actuating said second valve means in response to movement of said first valve means.

3. A device for directing a fluid pressure from one conduit to one of two other conduits, including an inlet conduit, a first outlet conduit, a second outlet conduit, a relay valve for connecting said inlet conduit to said first outlet conduit or said second outlet conduit, a drain conduit, a pressure conduit, a chamber at one end of said relay valve, a fourth conduit connected at one end to said chamber, a pilot valve connected to the other end of said fourth conduit for connecting said fourth conduit to said drain conduit or to said pressure conduit, a spring biasing said relay valve in a direction towards said chamber, a second chamber in said device, a member mounted in said second chamber for rotative movement, means for turning said member including bellows, one end of said member being connected to said pilot valve for moving it, said turning means having three bellows fixed to the side of said second chamber, the free end of each of said bellows being connected to said member, means supplying fluid pressure to two of said bellows, a bellows pressuring valve operatively connected with said relay valve, said bellows pressurizing valve including two inlet passageways and one outlet passageway, said outlet passageway being connected at its other end to the interior of the third of said bellows, said bellows pressurizing valve being adapted to connect said outlet passageway to one of said two inlet passageways in accordance with the position of said relay valve.

References Cited in the file of this patent

UNITED STATES PATENTS

| | | |
|---|---|---|
| 2,529,973 | Sedille et al. | Nov. 14, 1950 |
| 2,580,962 | Sedille | Jan. 1, 1952 |
| 2,592,062 | Perry | Apr. 8, 1952 |
| 2,641,324 | Fortescue | June 9, 1953 |
| 2,643,514 | Jubb | June 30, 1953 |
| 2,715,311 | Coar | Aug. 16, 1955 |